United States Patent Office 3,104,092
Patented Sept. 17, 1963

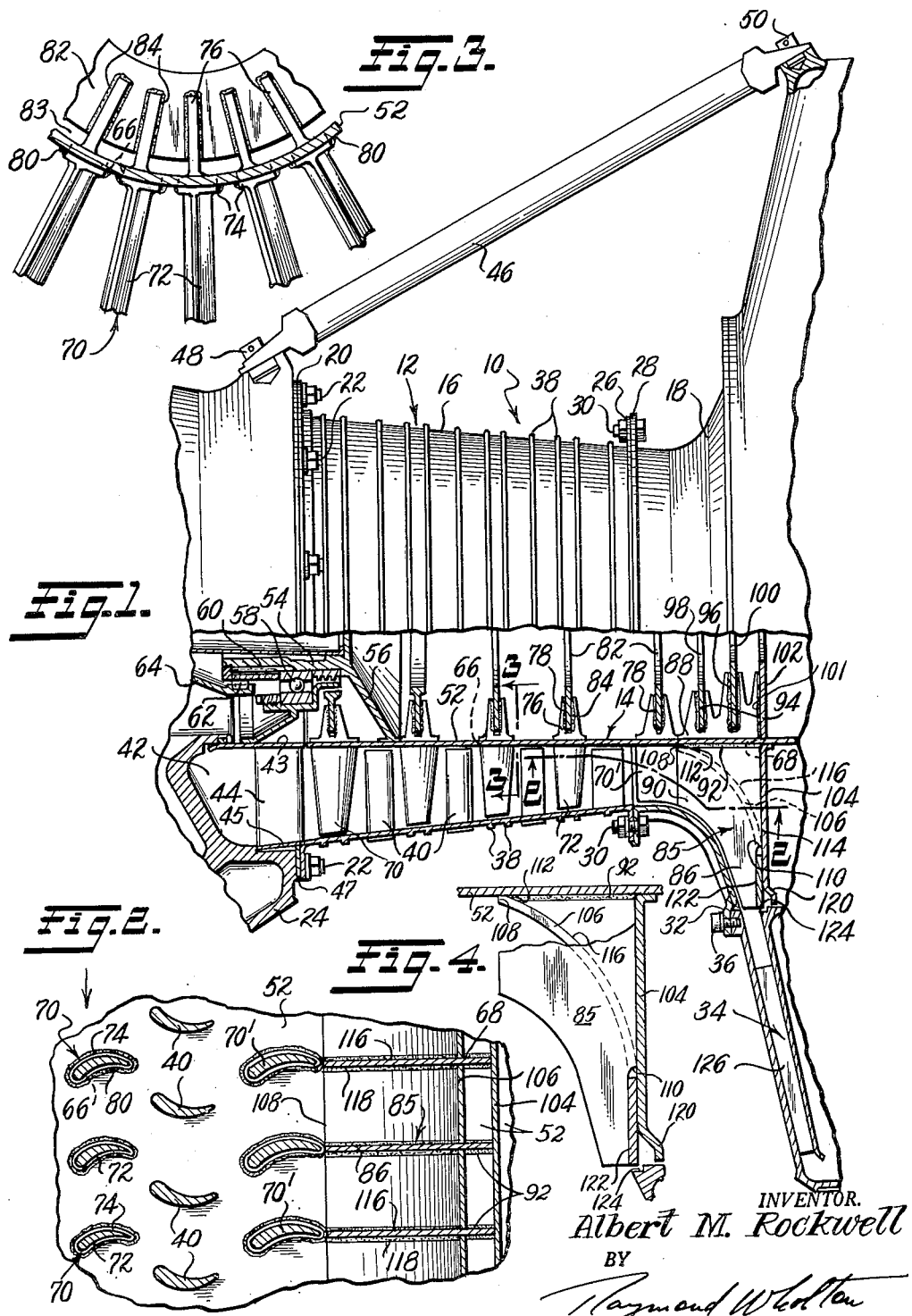

3,104,092
COMPRESSOR ROTOR CONSTRUCTION
Albert M. Rockwell, Glastonbury, Conn., assignor to United Aircraft Corporation, East Hartford, Conn., a corporation of Delaware
Filed July 6, 1961, Ser. No. 122,273
18 Claims. (Cl. 253—39)

This invention relates to bladed rotors of the type adapted for the interchange of forces with a fluid, particularly to bladed rotors of compressors adapted to energize a fluid by increasing its pressure and/or velocity, and to turbine rotors which are actuated by the pressure and/or the velocity of a fluid.

There is a strong demand for compressors and turbines which can be produced economically, especially for smaller units. Efforts have been made to produce such units of sheet metal. Most of such devices require a large amount of welding or brazing, which adds to the cost of their production. Furthermore, such devices lack the strength to handle large quantities of fluid or to operate at high speeds for compressors, or to withstand the temperatures and high speeds of turbines, especially where used with high temperature motive fluids.

It is an object of the invention, therefore, to provide a novel bladed rotor structure which can be produced economically, and which is capable of operation at relatively high speeds to handle large quantities of fluid.

It is a further object to provide a novel bladed rotor structure in which most of the parts are made of sheet metal and fused together.

It is a further object to provide a novel bladed rotor structure requiring a minimum of welding or brazing.

It is a still further object to provide a novel bladed rotor structure in which the root portions are joined together to carry the centrifugal forces.

It is a still further object to provide a novel bladed rotor structure in which the root portions extend into a hollow drum to facilitate cooling.

The above and other objects will become more apparent from a consideration of the following specification and the drawings forming a part thereof, in which:

FIG. 1 is a plan view, in quarter section, of a compressor embodying the invention;

FIG. 2 is a sectional view on the line 2—2 of FIG. 1;

FIG. 3 is a sectional view on the line 3—3 of FIG. 1; and

FIG. 4 is a detail of a compressor blade of FIG. 1 drawn to a larger scale.

While, in the ensuing description, the invention is described in connection with a bladed rotor forming a part of a gas compressor, it should be understood that the invention finds applicability in a turbine driven by steam, air, combustion products, or other gases.

Referring to the drawings, in which the same reference character is used throughout the several views to indicate the same element, the reference numeral 10 designates a compressor of the combined axial and radial flow type, comprising a stator 12 and a rotor 14.

The stator 12 is made up of two sections, including a housing 16 for the axial flow section and a housing 18 for the radial flow section. The axial flow housing 16 has a flange 20 on one end which is bolted at 22 to a mounting member, such as a gear casing 24, and a flange 26 on the other end which is connected with an end flange 28 on the radial flow housing 18 by a series of bolts and nuts 30. The other end of the radial flow housing carries a flange 32 connected with a diffuser 34 by a series of bolts 36. The axial flow housing 16 includes a series of external circumferentially extending reinforcing ribs 38, and a series of internal stator vanes 40 arranged in parallel rows, interdigitating with the blades of the rotor as will be described hereinafter.

The gear casing 24 is hollow to include a compressor inlet 42, and carries a ring of inlet vanes 44 to direct the incoming gas into the first stage of compressor blades. The ring of inlet vanes 44 is carried by an inner ring 43 and an outer ring 45, and is held in position by the bolts 22 passing through an external flange 47 between the flange 20 and the gear casing, as seen in FIG. 1. A series of struts 46, bolted at one end at 48 to the gear casing 24 and at the other end at 50 to the diffuser 34, assists in retaining the parts in assembled relation. The diffuser 34 may be part of the combustion chamber assembly in the case of a combustion turbine type of power plant, to which the compressor 10 feeds air for combustion.

The rotor 14 comprises a tubular member 52 of circular cross section, which may be made of sheet steel carrying, on one end, a stub shaft 54 connected with a frusto-conical connection member 56 which is fused to tubular member 52. The stub shaft 54 is rotatably supported by a ball bearing 58 within the gear casing 24, and is provided, on the end thereof, with a series of external splines engaging internal splines on a sleeve 60. Sleeve 60 carries, on one end, a series of external splines 62 which mesh with internal splines on the end of a power shaft 64, serving as a universal joint in the case of any misalignment of the connecting parts. The other end of the tubular member 52 is supported by a suitable bearing, not shown.

The tubular member 52 is provided with a number of apertures 66, arranged in a series of spaced parallel rows, for the reception of axial flow blades 70, and a single row of apertures 68 for the reception of radial flow blades 85.

As seen in FIG. 2, the apertures 66 are roughly elliptical and bent in form, to conform generally with the shape of the blades 70 and 70'.

The blades 70 and 70' include a fluid reactive portion 72 which is airfoil in cross section (FIG. 2), an enlarged base portion 74 fitted within the apertures 66, and a root portion 76 extending within the tubular member 52. The root portions 76 are provided with slots 78, the slots in each row of blades being aligned in a circle. The blades are secured in the tubular member by fusing 80, i.e., welding or brazing, between the base portions 74 and the apertures 66. In an alternative construction, the fusion of all or some of the blades 70 with the tubular member 52 may be omitted, thereby obtaining advantageous damping of harmful vibrations. A flat ring 82 is received within the slots 78 in each row of blades as the blades 70 and 70' are passed through the tubular member 52 and is fused to each blade, as shown at 84. As seen in FIG. 3, this arrangement provides a clearance or gap 83 between the outer periphery of the ring 82 and the inner wall of the tubular member 52 through which a cooling fluid may be directed if desired.

While, in the detailed description appearing above, a flat ring 82 is disclosed, it is evident that a flat disc would serve the same purpose. It is preferred, however, to employ a ring for the advantage of lightness, and also to allow an additional passage through the rotor for the circulation of a cooling fluid if desired, especially in the case of a turbine embodying this invention which operates on hot gases, such as combustion products.

The apertures 68 for the radial flow blades 85 may have parallel walls, and need not be shaped in the form of the apertures 66 for the axial flow blades 70 and 70'. The apertures 68 may extend axially, as shown in FIG. 2, or may have a circumferential component, or may be curved, depending on the particular form of the radial flow blading.

The radial flow blades 85 are made of sheet steel, and include an outer reactive portion 86 and an inner root portion 88. The blades 85 also include entrant axial flow portions 90 which may form continuations of axial flow blades 70', the incoming fluid being changed from axial flow to radial flow while passing between the radial flow blades 85. The blades 85 pass through the apertures 68 and are fused therein at 92. The root portions 88 include a pair of spaced slots 94 and 96, the slots 94 being aligned in a circle with the corresponding slots 94 in the other blades 85, and the slots 96 also being aligned in a circle with the corresponding slots 96 in the other blades 85. A pair of rings 98 and 100 are disposed within the slots 94 and 96, respectively, and are fused therein as shown at 101.

The discharge end of the tubular member 52 includes an internal flange 102 and an external, radially extending, flange 104. The internal flange 102 and the external flange 104 may or may not be integral with the tubular member 52. The internal flange 102 forms a reinforcing member for the tubular member 52, to which the edges of the root portions 88 are fused. It is preferred that the flange or ring 104 should be fused to the tubular member 52 and to the blades 85. Flange or ring 102, on the other hand, could be connected in a manner similar to the rings 98 and 100 and not contact or be fused with the tubular member 52, since the flange or ring 102 is intended to perform the same type of load carrying function as the rings 98 and 100.

A curved guide ring 106 is inserted between the radial flow blades 85 and forms an inner wall of the fluid flow passage in the radial flow section of the compressor, the outer wall being defined by the inner surface of the radial flow housing 18. The fluid reactive portions 86 of the blades 85 extend outwardly of the ring 106. Guide ring 106 would normally be fused with the blades 85, but, if damping of harmful vibrations is desired, such fusion may be omitted. The concave surface of the guide ring 106 is disposed outwardly, as shown in FIGS. 1 and 4, to facilitate the transition of axial flow to radial flow through the radial flow blades 85. The upstream edge of the guide ring 106 is indicated by the numeral 108, and is fused at 112 with the tubular member 52. The guide ring 106 is provided with a series of slots 116 through which the radial flow blades 85 pass, and in which they may be fused, if desired, at 118 (FIG. 2).

The outer edge of the external flange 104 includes a reverse curve 120, the outer edge of which is spaced closely adjacent to but out of contact with a circumferential lip 124 carried by the diffuser 34. The guide ring 106 includes a radial extension 122 which is fused to the outer end of the flange 104. The outer edge of extension 122 provides a slight clearance with a recess in the lip 124 in the inner wall of diffuser 34. The right hand edge of each blade 85 extends through one of the slots 116 and contacts the flange 104. At the outer end of each slot 116, the right hand edge of each blade is cut back beginning at the point 110 and continuing to the outer extremity of the blade, the cut back edge contacting the ring 122 as shown in FIG. 4. The flange 104 may be considered a cover for the right hand edges of the blades 85, shielding that portion of the blades from performing an unnecessary pumping action on the air to the right of the curved guide ring 106. Moreover, the right hand edges of the blades may be fused to the flange 104, whereby the flange is used to take part of the blade load. The members 120 and 122 cooperate with lip 124 to form a labyrinth type of fluid seal resisting the escape of gases from the compressor discharge.

The diffuser 34 includes a series of spaced guide vanes 126 to decrease the velocity of the gases discharged from the compressor, and, if desired, may be designed to also take some or all of the spin from the gases.

In operation, the rotor 14 may be rotated either by power supplied to the power shaft 64 or by power supplied by a turbine, not shown, connected with the right hand end of the rotor in the case of a combustion gas turbine installation. Air from the ambient atmosphere enters the inlet 42 and is guided by the inlet vanes 44 into the first stage of axial flow rotor blades 70. The air passes through the several axial flow compression stages in series, wherein the pressure and/or the velocity of the air is increased, and then through the radial flow blades 85 wherein the velocity is increased while the axial direction of flow is changed to radial, discharging at high velocity and increased pressure into the diffuser 34. The air is expanded in the passages of the diffuser 34, causing a conversion of velocity head to pressure head, while the guide vanes 126 may remove all or a part of the swirl or tangential components of the direction of air flow.

In the novel construction disclosed, the axial and peripheral forces on the blades are carried by the tubular member 52, in which the blades are mounted, and to which the blades may be fused, as by welding or brazing, as described above, while the radially outward blade forces, which are much greater than the other forces, are borne principally by the rings 82, 98, 100 and 102 fused in the slots in the root portions of the blades. The tubular member 52, therefore, can be made of lighter sheet steel than would be required if the tubular member were designed to carry the radially outward blade forces, resulting in a much lighter construction. The stresses in the rings act diametrically thereof, permitting the use of relatively thin rings. As a result, a very light and exceptionally strong structure is provided, with a considerable saving in materials. Furthermore, the parts may be assembled by simple welding or brazing operations, and do not call for close tolerances.

While, in the above description, the structure is disclosed as being made of steel, it is evident that other metals, such as aluminum, aluminum-magnesium alloys, etc., may be used, as well as plastics. The blades 70 may be made by casting, injection molding, stamping, or any well-known process employed in blade manufacture.

It will be understood that various changes may be made in the details of construction and in the arrangement of the parts of the bladed rotor disclosed herein without departing from the principles of the invention and the scope of the annexed claims.

I claim:

1. A bladed rotor adapted to interchange force with a fluid, comprising: a tubular member including a series of circumferentially aligned apertures; a plurality of blades, each blade including a fluid reactive portion and a root portion, said blades being fixedly mounted in said apertures with the root portions extending within the tubular member; means, directly connected with said tubular member, rotatably supporting said tubular member and said blades; and means, spaced from said tubular member and said rotatable supporting means, fixedly connected with and rigidly joining together said root portions which extend within said tubular member.

2. A bladed rotor as defined in claim 1, in which said root portions are slotted, and in which the means rigidly joining said root portions together comprises a ring in inwardly spaced relation with said tubular member engaging the slots in said root portions and fused therein.

3. A bladed rotor as defined in claim 1, in which each blade includes an enlarged base portion between said fluid reactive portion and said root portion, said base portion fitting within an aperture and fused therein.

4. A bladed rotor as defined in claim 1, in which each blade includes an enlarged base portion between said fluid reactive portion and said root portion, said portion fitting within an aperture and fused therein, and in which said root portions have slots therein, and in which the means rigidly joining said root portions together comprises a ring in inwardly spaced relation with said tubular member engaging the slots in said roots and fused therein.

5. A bladed rotor adapted to interchange force with a fluid, comprising: a tubular member, said member including a series of apertures arranged in a row circumferentially thereof; a plurality of blades, each blade including a fluid reactive portion and a slotted root portion, said blades passing through said apertures and fused therein with the slotted root portions extending within the tubular member; means, directly connected with said tubular member, rotatably supporting said tubular member and said blades; and means spaced from said tubular member and said rotatable supporting means, engaging the slots in said root portions which extend through said tubular member and fused therein to join together said root portions.

6. A bladed rotor as defined in claim 5, in which the tubular member is made of sheet metal.

7. A bladed rotor as defined in claim 5, in which the tubular member and the blades are made of sheet metal.

8. A bladed rotor as defined in claim 5, in which the blades are airfoil in cross section.

9. A bladed rotor as defined in claim 5, including an annular guide ring, disposed concentrically of said tubular member, having an upstream edge and a downstream edge, one edge being fused to said tubular member, said guide ring having apertures therein, and said row of blades extending through said apertures in said tubular member and in said guide ring.

10. A bladed rotor as defined in claim 5, in which said means joining the root portions together comprises a ring.

11. A bladed rotor adapted to interchange force with a fluid, comprising: a tubular member, said member including a plurality of apertures arranged in parallel, circumferentially extending rows; a plurality of blades, each blade including a fluid reactive portion and a slotted root portion, said blades passing through said apertures and fused therein with the slotted root portion extending within the tubular member, the fluid reactive portion of the blades in one row designed for axial flow of fluid and the fluid reactive portion of the blade in another row designed for radial flow of fluid; means, directly connected with said tubular member, rotatably supporting said tubular member and said blades; and means, spaced from said tubular member and said rotatable supporting means, engaging the slots in said root portions which extend within said tubular member and fused therein to join the root portions in a row together.

12. A bladed rotor as defined in claim 11, in which the root portion of each blade designed for radial fluid flow includes a plurality of slots.

13. A bladed rotor as defined in claim 11, in which each blade designed for axial fluid flow includes an enlarged base portion between the fluid reactive portion and the root portion, said base portion being fused in an aperture.

14. A bladed rotor adapted to interchange force with a fluid, comprising: a tubular member; a plurality of blades, each blade including a fluid reactive portion and a root portion; means, directly connected with said tubular member, rotatably supporting said tubular member and said blades; means fixedly mounting said blades in said tubular member; and means, inwardly spaced from said tubular member rigidly connecting the root portions together.

15. A bladed rotor adapted to interchange force with a fluid, comprising: a tubular member, said member including a series of apertures arranged in a row circumferentially thereof; means rotatably supporting said tubular member; a plurality of blades, each blade including a fluid reactive portion and a slotted root portion, said blades passing through said apertures and fused therein with the slotted root portions extending within the tubular member; means, spaced from said tubular member and said rotatable supporting means, engaging the slots in said root portions and fused therein to join together said root portions; and an annular guide ring having an upstream edge and a downstream edge, and being arcuate in transverse section and concave outwardly, one edge being fused to said tubular member, said guide ring having apertures through which said blades extend.

16. A bladed rotor adapted to interchange force with a fluid, comprising: a tubular member, said member including a series of apertures arranged in a row circumferentially thereof; means rotatably supporting said tubular member; a plurality of blades, each blade including a fluid reactive portion and a slotted root portion, said blades passing through said apertures and fused therein with the slotted root portions extending within the tubular member; means, spaced from said tubular member and said rotatable supporting means, engaging the slots in said root portions and fused therein to join together said root portions; and an annular guide ring, said guide ring being arcuate in transverse section and concave outwardly, said ring having parallel upstream and downstream edges, the tubular member including an external, radially extending flange, one edge of said guide ring being fused to said tubular member and the other edge being fused to said radially extending flange, said guide ring having apertures through which said blades extend.

17. A bladed rotor adapted to interchange force with a fluid, comprising: a tubular member, said member including a plurality of apertures arranged in parallel, circumferentially extending rows; means rotatably supporting said tubular member; a plurality of blades, each blade including a fluid reactive portion and a slotted root portion, said blades passing through said apertures and fused therein with the slotted root portion extending within the tubular member, the fluid reactive portion of the blades in one row designed for axial flow of fluid and the fluid reactive portion of the blades in another row designed for radial flow of fluid, each blade designed for radial flow including an axial flow portion; a guide ring extending between said blades designed for radial flow to change the flow of fluid from axial to radial, said guide ring being concentric with and being fused, at one edge, with said tubular member; and means, spaced from said tubular member and rotatable supporting means, engaging the slots in said root portions and fused therein to join together the root portions in a row.

18. A bladed rotor adapted to interchange force with a fluid, comprising: a tubular member, said member including a plurality of apertures arranged in parallel, circumferentially extending rows; means rotatably supporting said tubular member; a plurality of blades, each blade including a fluid reactive portion and a slotted root portion, said blades passing through said apertures and fused therein with the slotted root portion extending within the tubular member, the fluid reactive portion of the blades in one row designed for axial flow of fluid and the fluid reactive portion of the blades in another row designed for radial flow of fluid, each blade designed for radial flow including an axial flow portion; a guide ring extending between said blades designed for radial flow to change the flow of fluid from axial to radial, said guide ring having apertures through which the radial flow blades extend, said guide ring being concentric with and being fused, at one edge, with said tubular member; and means, spaced from said tubular member and rotatable supporting means, engaging the slots in said root portions and fused therein to join together the root portions in a row.

References Cited in the file of this patent

UNITED STATES PATENTS

| | | |
|---|---|---|
| 1,904,421 | Doran | Apr. 18, 1933 |
| 2,540,991 | Price | Feb. 6, 1951 |
| 2,743,053 | Gregory | Apr. 24, 1956 |
| 2,840,299 | Paetz | June 24, 1958 |
| 2,888,241 | Stalker | May 26, 1959 |
| 2,889,107 | Stalker | June 2, 1959 |
| 2,978,169 | Stanton | Apr. 4, 1961 |

FOREIGN PATENTS

| | | |
|---|---|---|
| 157,045 | Australia | Nov. 29, 1951 |